UNITED STATES PATENT OFFICE.

EDWIN TAYLOR, OF BROOKLYN, NEW YORK, ASSIGNOR TO UNION CLAY PRODUCTS COMPANY, OF NEW YORK, N. Y., A CORPORATION OF NEW JERSEY.

PREPARATION OF ALUMINOUS COMPOSITIONS.

989,662.  Specification of Letters Patent.  Patented Apr. 18, 1911.

No Drawing.  Application filed May 6, 1909. Serial No. 494,486.

*To all whom it may concern:*

Be it known that I, EDWIN TAYLOR, a citizen of the United States, and resident of Brooklyn, in the county of Kings and State of New York, have invented certain new and useful Improvements in the Preparation of Aluminous Compositions, of which the following is a specification.

My invention relates to the preparation of aluminous compositions, that is, compositions having clay as the main ingredient constituting the basis of such composition, and in which oil is combined with the clay and vulcanized, and has for its object to facilitate the manufacture of such composition.

In a separate application for Letters Patent I have set forth an improved composition in which clay is the basis or main ingredient and in which the clay is combined either naturally or artificially with a certain proportion of sulfur and to which an oil is so added that it will become vulcanized by the sulfur, the said composition having many advantages resulting from its fluidity or plasticity, according to the amount of oil employed, being serviceable as a waterproof coating or covering for many purposes and as an insulating material.

While it is practicable to secure extremely beneficial results by adding the sulfur and oil to the clay and vulcanizing the oil after such addition, I have found that great advantage results from first combining the oil and the sulfur and partially vulcanizing the oil, thereafter adding it to the clay, and completing the vulcanization.

The clay may, if desired, be entirely free from sulfur in its natural state, but I have found that advantage results from employing such clays as those known as blue clays, found on Long Island, and elsewhere, where there is a natural content of approximately two and one-half per cent. of sulfur resulting from the presence of metallic sulfids, such as sulfid of iron in the natural clay. With such a clay I combine any desired proportion of vulcanized oil which I secure by adding sulfur to the oil, heating the mixture to, say, about three hundred degrees and for a sufficient length of time to partially vulcanize the oil. After such partial vulcanization, the partially vulcanized oil is added to the clay and the mixture is then heated until the complete vulcanization of all the oil therein is effected. By this partial vulcanization of the oil before mixing it with the clay, I am able to so regulate the vulcanization as to prevent any possibility of carbonization, and I have found that the partially vulcanized oil, when combined with the clay already having a content of sulfur, results in securing a better vulcanizing effect upon the entire mass, it being very desirable to complete the vulcanization in the presence of the clay, as thereby I secure a more suitable composition and effective mixture of ingredients.

The above described composition of matter is serviceable for various purposes, for coating and waterproofing different materials or articles, forming flooring, linings for tanks, or insulating covering for various articles and materials, and can readily be hardened, or where sufficient oil is employed, can be applied as a paint or formed into a plastic condition so as to be used like any putty or calking material.

Without limiting myself to the proportions specified I claim as my invention:

1. The improvement in the preparation of aluminous compositions, the same consisting in adding partially vulcanized oil to clay having a content of sulfur, and then heating the mixture to complete the vulcanization of the oil.

2. The improvement in the preparation of aluminous compositions consisting in adding partially vulcanized oil to clay having a natural content of sulfur available for vulcanization, and then heating the mixture to complete the vulcanization of the oil.

3. In the preparation of aluminous compositions, first adding sulfur to a body of clay and intimately mixing the same, adding sulfur to oil and partially vulcanizing the latter, and then intimately mixing the clay and oil and thereafter heating the mixture to complete the vulcanization of the oil.

In testimony whereof I have signed my name to this specification in the presence of the subscribing witnesses.

EDWIN TAYLOR.

Witnesses:
 CHARLES E. FOSTER,
 CAROLINE E. DAVIDSON.

Copies of this patent may be obtained for five cents each, by addressing the "Commissioner of Patents, Washington, D. C."